May 30, 1939.  E. W. KREBS  2,160,594
ALTERNATING-CURRENT DYNAMO-ELECTRIC MACHINE
Original Filed April 1, 1936  2 Sheets—Sheet 1

Inventor:
Ernst W. Krebs,
by Harry E. Dunham
His Attorney.

May 30, 1939.  E. W. KREBS  2,160,594
ALTERNATING-CURRENT DYNAMO-ELECTRIC MACHINE
Original Filed April 1, 1936   2 Sheets—Sheet 2

Inventor:
Ernst W. Krebs,
by Harry E. Dunham.
His Attorney.

Patented May 30, 1939

2,160,594

UNITED STATES PATENT OFFICE 2,160,594

ALTERNATING-CURRENT DYNAMO-ELECTRIC MACHINE

Ernst W. Krebs, Berlin-Reinickendorf, Germany, assignor to General Electric Company, a corporation of New York Original application April 1, 1936, Serial No. 72,196. Divided and this application November 22, 1938, Serial No. 241,849. In Germany April 10, 1935

12 Claims. (Cl. 171—223)

This application is a division of my copending application Serial No. 72,196, filed April 1, 1936, and assigned to the same assignee as my present application.

My invention relates to alternating-current dynamo-electric machines and has for its principal object the utilization of self-excitation of such machines for control or regulation purposes.

It is an object of my invention to provide a precise, thoroughly reliable system for regulating, limiting, or controlling variable quantities, such as speed, pressure, temperature, voltage, current, etc.

It is a further object of my invention to provide such a system in which the operation is fully automatic.

Still another object of my invention is to provide a regulating system which is entirely electrical, avoiding the effects of friction, inertia, centrifugal force, and the like.

Other and further objects and advantages will become apparent as the description proceeds.

It is known that self-excitation takes place in rotating alternating-current machines under certain conditions. Thus, excitation or magnetization of the field may be brought about in consequence of capacity effects, for example, by connecting condensers to the machine. Or, in cases of commutator machines, the magnetization may also be produced by armature windings. Such self-excitation takes place in both synchronous and asynchronous machines regardless of whether the machines are designed for single-phase or polyphase service.

In accordance with my invention in its preferred form, an alternating-current generator is driven from a shaft, the speed of which is to be regulated, or which rotates at a speed responsive to some other quantity to be regulated, such as frequency, voltage, pressure, etc. The appearance of voltage at the terminals of the generator is made critical to a predetermined speed by utilization of the capacity effect, and the generator output is either directly or indirectly utilized for operating an alarm or for operating devices correcting the speed of the apparatus driving the generator.

Figure 1:
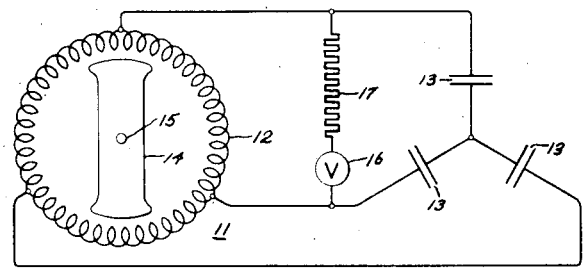
Figure 2:
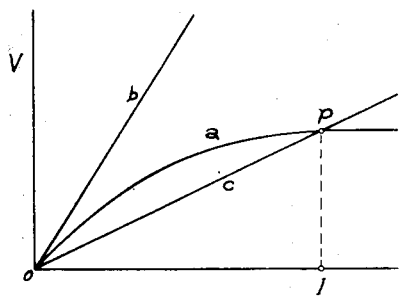
Figure 3:
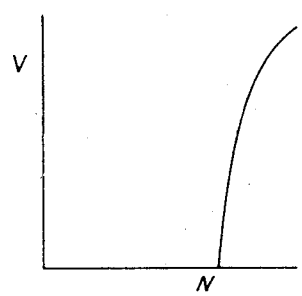
Figure 4:
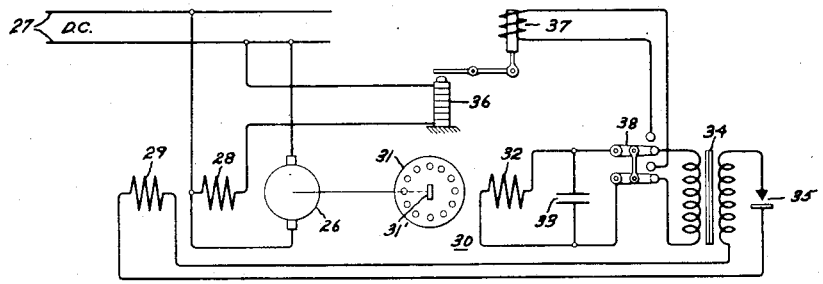
Figure 5:
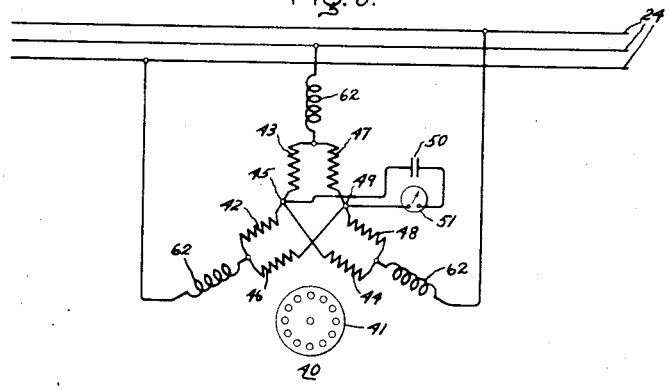
Figure 6:
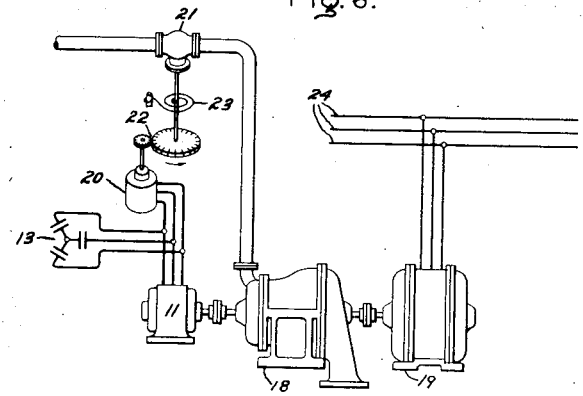
Figure 7:
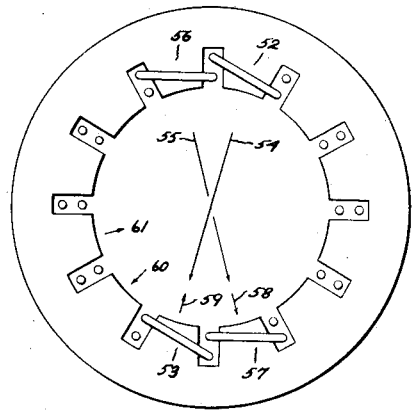

The invention will be understood more readily from the following detailed description when considered in connection with the accompanying drawings, and those features of the invention which are believed to be novel and patentable will be pointed out in the claims appended hereto. In the drawings, Fig. 1 represents schematically a synchronous machine arranged in accordance with an embodiment of my invention; Fig. 2 is a graph explanatory of the principle of operation of the apparatus of Fig. 1 at a predetermined speed; Fig. 3 is a graph explanatory of the operation at varying speeds; Fig. 4 is a circuit diagram representing schematically another embodiment of my invention employing an asynchronous machine; Fig. 5 is a circuit diagram of a unitary frequency-responsive machine constituting another embodiment of my invention; Fig. 6 is a schematic diagram of a turbine governor embodying my invention; and Fig. 7 is a schematic diagram representing the stator core of the embodiment of Fig. 5.

Referring more in detail to the drawings, a three-phase synchronous generator 11 is shown in Fig. 1 with a stator winding 12 connected to the condensers 13 arranged in Y or star connection. The rotor 14 is of the salient pole type and, for the sake of simplicity, carries no winding. The rotor 14 is mounted on a shaft 15 and the apparatus is designed to be responsive to the speed of rotation of the shaft 15, which is driven by a suitable source of mechanical power. Suitable means are provided for obtaining a response to the voltage induced in the stator windings 12. By way of example, I have shown a voltmeter 16 for this purpose with a multiplier 17 of such high resistance as to eliminate substantially any inductive effect of the voltmeter windings. However, since the apparatus responds to a critical speed and it is sufficient to detect the appearance of current or voltage without measuring it, it is not necessary to use a measuring instrument and a simple indicator or relay, or a relay of any suitable type such as shown in Fig. 4 or in Fig. 6, e. g., may be used.

A running-light excitation curve for a predetermined speed of the synchronous machine 11 is shown at a in Fig. 2. In Fig. 2, voltage is represented by distances measured vertically and current by distances measured horizontally. The curve a accordingly represents generator voltage plotted against exciting current and tends to taper off in slope, owing to the effect of saturation. As is well known, a quadrature leading current in the load windings of an alternating-current generator magnetizes the field and is the equivalent of a magnetizing current flowing in a special field winding. Accordingly, the curve a may be plotted in terms of quadrature leading current drawn from the generator windings, and load currents drawn by condensers connected to the generator 11 may be plotted on the same graph as the running-light excitation curve $a$. The curves $b$ and $c$ represent the relationship between applied voltage and currents drawn by different condensers having two different capacities and are straight lines through the origin O owing to the linear relationship between voltage and current in a condenser at any given frequency. The slopes of the curves $b$ and $c$ represent the capacitative impedances of the condensers in question and it will be seen that the slope of the curve $b$ is so great as not to intersect the curve $a$ except at the origin, whereas the slope of the curve $c$ is such that the curve $c$ intersects the curve $a$ also at the point P.

Fig. 2 demonstrates graphically that if condensers having an impedance represented by the slope of the curve $c$ are connected to the machine 11, once excitation is started the excitation will be sustained and the voltage and current will rise to the point P at which the curves $a$ and $c$ intersect and stability is attained. At the point P the ratio of generator voltage to exciting or inducing current is equal to the impedance of the condenser represented by the slope of the curve C. Ordinarily, there is sufficient initial excitation from residual magnetization or other causes to start the rise in voltage and flow of current. However, if desired, a weak direct-current exciting field or a weak permanent magnet may be provided for initial excitation; or, if desired, rotor material may be employed having an especially high remanence. On the other hand, with a condenser impedance of such magnitude as represented by the slope of the curve $b$, the condenser-current curve and the generator-excitation curve do not intersect, indicating that the generator cannot produce sufficient voltage to maintain current and the generator cannot excite itself.

It is apparent that, for a predetermined speed, there is a critical value of capacity above which the machine becomes self-exciting. Conversely, for a predetermined value of capacitance and variable speed, there is a critical speed above which the machine becomes self-exciting since generated voltage increases with speed whereas the condenser voltage for a given condenser current varies inversely with speed and frequency. The latter characteristic will be apparent from Fig. 2 if one considers that, with greater speeds, the ordinates of the curve $a$ will be raised and, since capacitative impedance varies inversely with generator speed (owing to the proportionality between speed and frequency), the ordinates of the condenser-current curves, such as curve $b$, will be lowered. This characteristic of the system may be plotted as in Fig. 3, in which vertical distances represent voltage and horizontal distances represent speed. Up to a predetermined speed, there is no appreciable excitation whereas, above this speed, the machine becomes self-excited and the voltage rises rapidly with speed.

The abrupt rise in voltage at a predetermined speed makes the apparatus of great value in speed-limiting apparatus for safety purposes. In place of the voltmeter 16, one may connect suitable apparatus, such as an overspeed alarm, a device for cutting off the power and shutting down the apparatus, as by shutting off the fuel supply of a prime mover, or a device for correcting the speed. For example, my speed-responsive device may be utilized as a turbine governor to regulate steam supply valves or as a motor speed regulator to vary the field strength, brush position, or some other condition of a motor. Such speed-controlling or correcting apparatus may be connected to the output windings of the generator, directly or indirectly, as will be explained more in detail hereinafter.

In the arrangement of Fig. 6, for example, wherein a synchronous generator 11, such as that of Fig. 1, is utilized to govern the speed of a turbine 18 or to govern the frequency of an alternator 19 driven by the turbine 18, the windings of the generator 11 are connected directly to the induction or commutator type valve motor 20. The valve motor 20 serves to rotate a valve 21 through suitable gearing 22 in the direction of the arrow in order to reduce the flow of steam supplied to the turbine 18 whenever the speed exceeds a predetermined value at which the generator 11 becomes self-exciting. The motor 20 continues to close the valve 21 further until the speed of the turbine 18 is reduced to the proper value. Suitable means, such as a spring motor 23, are provided for opening the valve 21 in case the turbine speed falls below the desired value.

Certain types of speed governors, such as flyball governors, in effect measure centrifugal force and act when centrifugal force attains a predetermined value, which makes it difficult to construct such governors for very precise speed control. My governor has the advantage of producing a speed-correcting force abruptly at a predetermined speed so that it acts positively to maintain such a speed. Another difficulty experienced in mechanical governors is that the speed-responsive mechanism, which includes sliding parts, must overcome friction of some moving part, and frequently also the force of a restraining spring in order to act. Corrosion and other uncontrollable circumstances change both friction and spring strength and introduce uncertainty in the operation of mechanical governors. Such difficulties are overcome in my governor, however, since the speed-responsive element, itself, is wholly electrical. My device, furthermore, affords great reliability and safety, requires no independent current source, includes no electrical contacts, and its operation is, therefore, not dependent upon the continuity of operation of such auxiliary apparatus.

Fig. 4 illustrates an embodiment of my invention in which the connection between the speed-responsive generator and the speed-correcting apparatus is indirect instead of direct, in which an electric motor rather than a prime mover has its speed regulated, and in which the speed-responsive generator takes the form of an asynchronous machine, more specifically an induction-type machine; however, it will be understood that my invention is not limited to the precise arrangement, but obviously includes employing any of such features in a different environment.

In the specific system illustrated in Fig. 4, there is a direct-current motor 26, the speed of which is to be held at a predetermined value. The motor 26 is energized by a current source 27 and has a main shunt field 28 as well as an auxiliary field 29. The design is such that the winding 29 may be employed to effect the entire variation in field strength that may be required to hold the motor speed at a constant value under the variations in operating conditions to which the motor may be subjected.

Mechanically connected to the motor 26 is an induction generator 30 with a squirrel cage rotor 31 and a stator winding 32. To provide exciting current for the generator 30, a condenser 33 is connected to the winding 32. The speed-responsive generator 30 is indirectly connected to the motor speed controlling field winding 29 by means of a voltage or current transformer 34 with a rectifier 35 interposed between the motor field winding 29 and the transformer 34.

In a manner similar to that explained in connection with the embodiment of Fig. 1, when a predetermined critical speed is attained, the induction generator 30 will abruptly become exciting. As in the case of the embodiment of Fig. 1, residual magnetism may be relied upon for producing initial excitation, or auxiliary means such as a small permanent magnet 31' carried by the rotor 31 may be employed. The frequency of the voltage and current produced will, as is well known to those skilled in the art, be lower than the frequency of a synchronous machine having a like number of poles and angular speed, as a result of the slip, characteristic of induction machines. Current will be induced in the transformer 34 and rectified by the rectifier 35, causing an exciting current to flow in the motor field winding 29 and increasing the field strength of the motor 26. Thereupon, the motor speed will fall until the field 29 weakens and an equilibrium is reached.

In place of using the transformer 34 and rectifier 35 to bring about correction in the field strength of the motor 26, I may use any other suitable appliance. For example, I may employ a carbon pile rheostat 36 in series with the field and controlled by a solenoid winding 37 connectible to the generator 30. To connect the apparatus for this method of operation, a double-pole, double-throw switch 38 is moved to the upward position.

The supervision of the frequency of an alternating current network may be accomplished by means of a speed-responsive generator driven by either a synchronous motor or alternator or an induction motor connected to the network in question. For example, as explained in connection with Fig. 6, the generator 11 is responsive to the frequency of the network 24 to which the alternator 19 is connected. However, if desired, a driving motor and a speed-responsive generator may be combined in one unit.

For example, as illustrated in Fig. 5, a double-winding induction machine is connected to the network 24, the frequency of which is to be supervised. The machine 40 is provided with stator windings forming two different numbers of poles, the fields of which do not mutually interact.

Although separate windings may be employed for the two sets of poles, some saving in material may be effected by employing a winding adapted to be reconnected for two different numbers of poles, as illustrated in Fig. 5.

The machine 40 employs a squirrel cage rotor 41 and a stator with two groups of stator coils connected in Y. One group of coils 42, 43, 44, is connected to a common Y point 45 and the other group of coils 46, 47, 48, is connected to a second common Y point 49. The two Y groups are connected in parallel to the three-phase network 24. A condenser 50 is connected between the Y points 45 and 49 and a suitable voltage or current-responsive device 51, such as an indicator or relay, for example, is also connected in the stator circuit. When the machine 40 becomes self-exciting, a voltage is induced which, depending upon the connection employed, may possibly be one and a half or six times the frequency of the network 24.

For example, in the arrangement represented by Figs. 5 and 7, the stator coils form three parallel pairs for the three phases with respect to the network 24. Assuming a two-pole machine for this connection, the coil 44 is divided into two parts, 52 and 53 (Fig. 7), producing a flux in the direction of the arrow 54, and the coil 48 is also divided into two parts, 56 and 57, producing a flux in the direction of the arrow 55. The fluxes 54 and 55 combine to form a resultant flux in which the poles are 180 mechanical degrees apart to produce a two-pole machine.

In accordance with the well known theory of operation of polyphase machines, the windings of the other phases (not shown in Fig. 7) will produce two-pole fluxes at successively later periods to combine with the fluxes of the windings 44 and 48 and produce a two-pole rotating field.

With respect to the condenser 50, however, the coils 44 and 48 (Fig. 5) are in series and not in parallel and any current therein produces two opposite fields, 58 and 59 (Fig. 7). In a similar manner, the coils 42 and 46 produce two opposite fields 60 and 61, and likewise for the other coils around the periphery of the stator. Since the polarity reverses every thirty mechanical degrees, self-excitation produces twelve poles and tends to induce a current having six times the frequency of the network 24. In brief, with respect to the network 24, the connection of the stator winding is three-phase two-pole but, with respect to the condenser 50, the connection is single-phase twelve-pole.

The increased frequency of the condenser circuit has the advantage of diminishing the size of condenser required. In order to prevent the higher frequency circuit from being short-circuited by the network 24, which is to be regulated, there are interposed inductances 62 in series with the stator coils and the network 24.

In an analogous manner, the voltage of a network may be kept constant by having a driving motor connected to the network, which motor varies in speed with applied voltage as in the case of direct-current shunt motors, and having a speed-responsive generator, such as described, rotated by the driving motor.

I have already referred to the fact that, if the frequency or speed is held constant and the capacity is allowed to vary, there will be a critical value of capacity above which the machine becomes self-exciting. An abruptly rising curve, similar to that of Fig. 3, may, therefore, be obtained, plotting voltage against capacity. This characteristic may be utilized for guarding high-tension transmission lines or generators against grounds since grounds greatly influence the capacity. For example, a generator susceptible of self-excitation driven at a substantially uniform speed may be connected to the conductors of a transmission line or to such conductors and ground, so that the capacity of such a transmission line constitutes a leading-current load for the generator corresponding to the condensers 13, 33 or 50. When the line becomes grounded, the capacity thereof will change and affect the excitation of the generator provided it is so designed that the normal capacity of the transmission line is near the critical capacity of the generator. Preferably the speed of the generator is made such that frequency induced by self-excitation is different from the frequency of the power current delivered by the transmission line and the capacity-responsive generator does not constitute any appreciable load on the transmission line.

In carrying out my invention by employing the self-excitation of direct-current machines for supervising variable quantities, I am unable to use resistors which decrease in voltage-to-current ratio with frequency as in the case of condensers. However, I may obtain a relatively abrupt rise in generated voltage by employing a loading resistor which falls off in resistance with applied voltage, such as carbon or a suitable composition of carbon and silicon-carbide as described in United States Patent No. 1,822,742, McEachron. Nevertheless, for the most precise work, I prefer commutatorless alternating-current machines to either direct-current or commutator-type alternating-current machines, in order to eliminate the indefiniteness of brush contact resistance.

I have herein shown and particularly described certain embodiments of my invention and certain methods of operation embraced therein for the purpose of explaining its principle and showing its application but it will be obvious to those skilled in the art that many modifications and variations are possible, and I aim, therefore, to cover all such modifications and variations as fall within the scope of my invention which is defined in the appended claims.

What I claim as new and desire to secure by Letters Patent of the United States, is:

1. A speed-responsive device comprising in combination, an alternating-current generator susceptible of self-excitation with a condensive load and adapted to be driven at varying speeds in accordance with variations in a speed to which the apparatus is intended to respond, a condenser connected to said generator, and a relay connected in circuit with said generator, said condenser being of such capacity that its voltage-current curve intersects the running-light excitation curve of said generator plotted with respect to leading current drawn therefrom.

2. Apparatus responsive to a predetermined speed comprising an alternating-current generator adapted to be self-excited by leading current drawn therefrom and adapted to be driven at varying speeds in accordance with variations in a speed to which the apparatus is intended to respond, a capacitative current-consuming device connected to said generator, and a relay connected in a circuit with said generator, said current-consuming device having such a capacity that, at the frequency of said generator corresponding to said predetermined speed, said current-consuming device has an impedance equaling the ratio of the voltage of said generator to the leading current required to induce such a voltage.

3. A speed-responsive device comprising in combination, a dynamo-electric machine adapted to be self-excited and adapted to be driven at varying speeds in accordance with variations in a speed to which the apparatus is intended to respond, such that the ordinates of its running-light excitation curve drawn with respect to leading current drawn therefrom rise with increasing speed, an impedance connected to said dynamo-electric machine having a voltage-current curve intersecting said excitation curve for a speed above a predetermined value, and a relay in circuit with said machine.

4. A speed-responsive device comprising in combination, a dynamo-electric machine adapted to be self-excited, a current-consuming device connected to said machine and a relay in circuit with said machine, said current-consuming device having a variable voltage-to-current ratio which decreases with increase in machine speed.

5. A speed-responsive device comprising in combination, a stator having a generating winding, a salient pole rotor, a condenser connected to said stator winding for drawing excitation therefrom, and a relay in circuit with said stator winding, said rotor being adapted to be driven at varying speeds in accordance with variations in a speed to which the apparatus is intended to respond, the capacity of said condenser in relation to the electrical characteristics of said stator and rotor being such that said condenser draws an exciting current from said stator winding only above a predetermined rotor speed.

6. A speed-regulating system for a direct-current motor comprising in combination with said motor, an alternating-current generator driven by said motor, said generator having an output winding, a condenser connected to said winding, an auxiliary field winding for said motor, and rectifying means interposed between said generator and said field winding, said generator being adapted to be self-excited by leading current drawn therefrom and said condenser being of such capacity as to draw a current corresponding to the excitation current of said generator at a predetermined generator speed.

7. A frequency-responsive device for a polyphase network comprising in combination, an alternating-current dynamo-electric machine having a double polyphase stator winding with the two polyphase parts connected to said network and acting conjointly with respect to said network to produce the same number of poles in both parts, and a condenser for producing self-excitation interconnected between the parts of said stator winding.

8. A frequency-responsive device for a polyphase network comprising in combination, an alternating-current dynamo-electric machine having a plurality of phase windings exceeding in number the number of phases of said network, each winding being connected at one end to said network and at the other end to another of said windings, said connections being windings serving as intermediate points, and a condenser connected between intermediate points.

9. A speed-responsive device comprising in combination, an alternating-current dynamo-electric machine adapted to be self-excited and adapted to be driven at varying speeds in accordance with variations in a speed to which the apparatus is intended to respond, a condenser connected to said machine and having sufficient capacity to draw exciting current from the machine at frequencies above a value corresponding to a predetermined speed of the machine, and a relay in circuit with said machine.

10. A regulating system for a direct-current dynamo-electric device comprising in combination with said device, an alternating current generator mechanically connected to said device, said generator having an output winding, a condenser connected to said winding, an auxiliary field winding for said dynamo-electric device, and rectifying means interposed between said generator and said field winding, said generator being adapted to be self-excited by leading current drawn therefrom and said condenser being of such capacity as to draw a current corresponding to the excitation current of said generator at a predetermined generator speed.

11. A speed regulating system for a driving device having a speed adjusting mechanism, said system comprising in combination with said driving device an alternating current generator driven by said device, said generator having an output winding, a condenser connected to said winding, a relay in circuit with said generator and connected in operating relation to said adjusting mechanism, said generator being adapted to be self-excited by leading current drawn therefrom and said condenser being of such capacity as to draw a current corresponding to the excitation current of said generator at a predetermined generator speed.

12. A regulating system for varying a characteristic of a rotating electrical machine in response to variations in speed, comprising in combination with such a machine including a regulating winding, an alternating current generator mechanically connected to said machine, said generator having an output winding, a condenser connected to said output winding, said output winding being in operative relationship to said regulating winding, said generator being adapted to be self-excited by leading current drawn therefrom and said condenser being of such capacity as to draw a current corresponding to the excitation current of said generator at a predetermined generator speed.

ERNST W. KREBS.